United States Patent

McGrew

[11] 4,065,389
[45] Dec. 27, 1977

[54] APPARATUS FOR DETECTING PROPORTION OF OIL IN OIL/WATER MIXTURES

[75] Inventor: Jay L. McGrew, Littleton, Colo.

[73] Assignee: Marine Construction & Design Co., Seattle, Wash.

[21] Appl. No.: 718,799

[22] Filed: Aug. 30, 1976

[51] Int. Cl.² .............................................. B01D 15/02
[52] U.S. Cl. .................................... 210/96 R; 210/86; 210/104; 210/391; 210/DIG. 26
[58] Field of Search ...................... 210/86, 96, 97, 104, 210/107, 391, 30 A, 396, 110, 114, 115; 73/61.1 A; 137/391, 101.25, 101.27

[56] References Cited

U.S. PATENT DOCUMENTS

| 2,025,883 | 12/1935 | Mobley | 210/104 X |
|---|---|---|---|
| 2,805,774 | 9/1957 | Griswald | 210/110 |
| 3,508,663 | 4/1970 | Brill | 210/396 |
| 3,578,585 | 5/1971 | Yahnke | 210/30 A |
| 3,836,000 | 9/1974 | Jakubek | 210/104 |
| 3,875,051 | 4/1971 | Kovarik | 210/104 X |
| 3,915,859 | 10/1975 | Sundin et al. | 210/104 |
| 3,937,662 | 2/1976 | Bartik | 210/104 |
| 3,971,719 | 7/1976 | Peters | 210/104 |

Primary Examiner—John Adee
Attorney, Agent, or Firm—Christensen, O'Connor, Garrison & Havelka

[57] ABSTRACT

Apparatus for separating oil from water in the process of transferring oil/water mixture at a predetermined rate from a source to an output includes means for indicating when the percentage of oil exceeds a predetermined value. By pumping the accumulating oil from an oil output sump in the apparatus at a predetermined pumping rate, a predetermined fraction of the oil/water mixture separator transfer rate, and by detecting level of oil rising in the sump above said range with the oil pump operating, the system is made responsive to the proportion of oil in the mixture above a certain percentage. Any one or more of various responsive functions may thereby be initiated such as sounding an alarm, terminating an industrial process, momentarily interrupting operation of the oil/water separator, etc.

2 Claims, 1 Drawing Figure

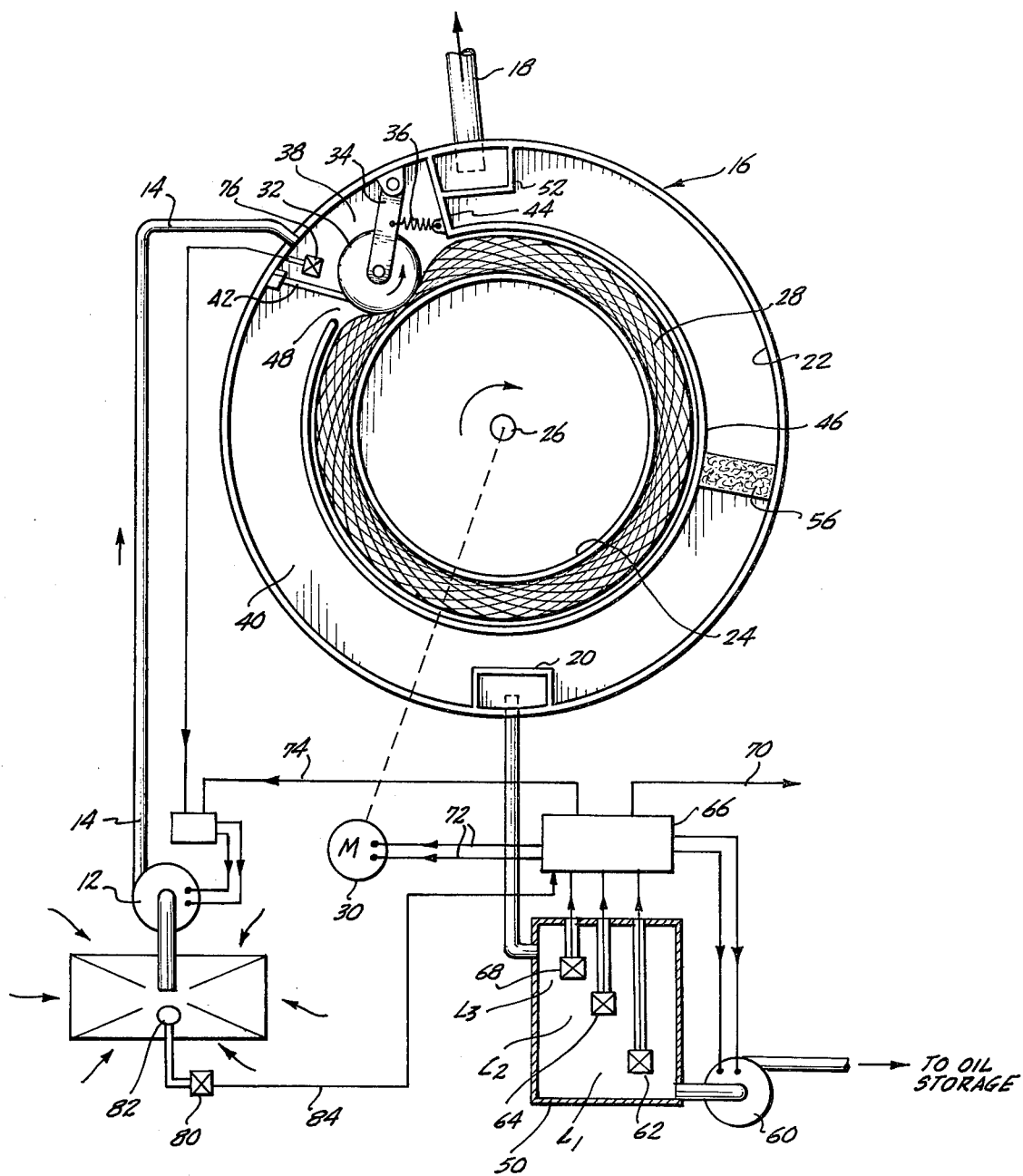

APPARATUS FOR DETECTING PROPORTION OF OIL IN OIL/WATER MIXTURES

BACKGROUND OF INVENTION

This invention relates to apparatus for sensing the presence of oil above a certain percentage in water, and is intended primarily for use in industrial plants, oil tank farms and other installations wherein it is necessary to detect the presence of oil in water above a certain percentage, (i.e. number of parts per million). Applications include preventing the recycling of oil-polluted water from an industrial process, preventing the discharge of oil-pulluted yard area run-off water into lakes, streams, etc., providing a reliably sensitive means for detecting oil leaks and spills, and similar uses. As herein illustratively described, the invention is advantageously embodied in certain oil/water separating apparatus of the nature disclosed in copending patent application Ser. No. 566,926, filed Apr. 10, 1975, the teachings of which are hereby incorporated herein by this reference. However, it will be recognized that the present invention has other applications as well and that the same may be practiced in varying forms without departing from the essential features involved.

There are many important applications in which surface runoff water or industrial process waste or recycling water may become contaminated with oil. In most situations as long as the oil occurs merely in trace amounts (i.e., such as a few parts per million), no responsive or corrective action is required. In many of these cases continuous or intermittent samplings of water being recycled or discharged may be an adequate safeguard without necessity of passing all of the water through a separator to assure removal of excess oil. The present invention is useful in detecting or responding to an excessive proportion of oil in samplings of water. However it is equally effective in conjunction with the continuous or intermittent operation of an oil/water separator routinely processing all of the discharging or recycling water in a purification system.

For example, in the case of an oil tank farm, such as at a tanker truck terminal, in which oil is routinely pumped into and from storage tanks, there are bound to be minor amounts of oil spillage on aprons and open yard areas from time to time. A major leak or spill is also possible. Rainwater and other surface run-off water collecting in or passing through such a facility should therefore be processed or at least sampled and tested as a matter of course before it is discharged into a storm sewer or directly into open bodies of water. Typically, drainage and run-off water to be discharged is first collected in a sump. By intermittently or continuously testing this water for percentage of oil the present invention affords a sensitive means of automatically sounding an alarm or taking other remedial measures should excess oil occur, such as if one of the main storage tanks spring a leak. In addition this invention provides a means to process water to separate out the oil while reliably and accurately sensing an abnormally high proportion of oil present in the water from any source or cause.

It is also an object hereof to provide a means for sensitively detecting the presence of oil in water above a certain proportion during and in conjunction with oil/water separation processing that is effective whether the oil occurs in an emulsified state, a stratified or coalesced state, or both.

Still another object hereof is to devise a simple, sensitive and reliably accurate oil proportion detector operable in a separator system of the nature indicated, which adds minimal cost or complexity to the system and which does not interfere with normal operation thereof. A related object is to provide such a detector that functions consistently under dynamic operating conditions whether the separator is operating on a continuous or intermittent basis. Moreover, such detection apparatus provides substantially immediate response when percentage of oil in the mixture increases above a predetermined value, and it requires no delicate calibration adjustments, and no special primary or preconditioning for start-up.

A further object hereof is to provide a combined oil/water separating and oil proportion excess sensing system with the capability of accommodating or disregarding momentary oil proportion excesses. A related object is to also provide in such a system the capability of processing (i.e., separating) oil/water mixture in normal manner while oil percentage remains below a certain value and of shutting down automatically when it exceeds the oil volumetric rate handling capacity of the system.

BRIEF DESCRIPTION OF INVENTION

As herein disclosed, in the operation of the basic oil/water separator in and as a part of which the invention is incorporated, oil/water mixture is first ingested into successively contiguous longitudinally extending zones of the small-pore elastomeric reticular foam jacket of a rotary separator drum. By rotating the drum slowly about a vertical axis the injected mixture is held for a period under essentially zero acceleration conditions wherein the oil particles, subjected otherwise only to the force of gravity, are able to settle and coalesce upon the oleophilic surfaces, however small the particles. With each orbit of the drum passing its successively contiguous longitudinally extending zones under a compression roller during continous rotation of the drum, water and coalesced oil are purged from the jacket on one side of the roller while fresh oil/water mixture is ingested into the jacket by its elastic re-expansion immediately adjacent the opposite side of the roller. With negligible oil present in the original mixture, discharge water flows out of an adjacent tank when it rises above a certain limiting level therein. Coalesced oil, being lighter than water, floats to a higher level in a separate compartment communicating with the first where it can then flow over a weir set slightly above said limiting level. Such overflow oil enters a collecting sump or chamber. Since the jacketed drum itself acts as a mixture pump of known pumping rate, the rate at which oil accummulates in said collecting chamber is proportional to the proportion of oil in the mixture being processed. An oil pump is connected to pump oil from the collecting chamber to a point of storage or disposal. The pumping rate of such oil pump is established in the same proportion to the known "pumping" rate of the oil/water separation drum device as the maximum acceptable or tolerable percentage of oil in the mixture being processed. Moreover, such oil pump is turned on and off by upper level and lower level limit switches responding to oil level in such chamber rising and falling respectively to the actuating levels of such switches so as to keep the level of oil in the chamber within a certain range. Therefore, as long as the rate at which oil flowing into such chamber does not exceed the pumping rate of the oil pump for longer than a short interval the oil/water mixture will be processed and the oil pumped away uneventfully. However, a third, excess level limit switch, set to be actuated at a still higher level of oil in such oil collection chamber, responds when the pumping rate of the oil pump is exceeded for a sufficient time period to allow oil accummulating faster than such rate to rise to such higher third level. Actuation of this third limit switch thereby signals a percentage of oil above a certain value in the mixture being processed. Actuation of this latter switch may be used to trigger any one or more of a number of events, such as sounding an alarm, operating an indicator, closing a valve, terminating a process, etc. In addition it may be used to stop rotation of the rotary drum as a mixture pump, in order to allow time for the oil pump to catch up with oil already accummulated.

These and other features, objects and advantages of the invention will become more fully evident as the description proceeds with reference to the accompanying drawings.

BRIEF DESCRIPTION OF DRAWINGS

FIG. 1 is a functional schematic diagram of the system wherein the coalescer-separator unit is depicted in simplified plan view, whereas the output oil chamber or sump is depicted in side elevation.

DETAILED DESCRIPTION OF PREFERRED EMBODIMENT

In the drawing, water with varying amounts of oil is typically first collected in some manner such as in a sump 10. For purposes of illustration let it be assumed that sump 10 receives industrial waste water or water to be recyled in industrial process, or drainage and run-off water from the yard and berm-surrounded areas of an oil tanker terminal or the like. In any such case oil/water mixture accummulating in sump 10 is withdrawn by pump 12 through pipe 14 either continuously or intermittently and monitored for percentage of oil in processing unit 16. Concurrently with and as a condition of such monitoring in accordance with this invention, oil is separated from the water in being pumped through processing unit 16, such that the water discharging from its outlet pipe 18 is purged of oil whereas the separated oil collecting flowing over weir 20 in outlet sump 50 is substantially free of water.

The specific design of processing unit 16 may vary. As shown it comprises a cylindrical tank 22 with its cylinder axis vertical. A cylindrical separator drum 24 is mounted within the tank 22 to rotate on a central vertical axis on support shaft 26. Extending substantially the full internal height of the tank 22, the cylindrical outer wall of drum 24 is jacketed by a uniform layer 28 of fine-pore (i.e. of the order of 100 pores per inch) reticulated polyurethane foam or other suitable oil-coalescing oleophilic, hydrophobic matrix material as and for the purpose described in the aforesaid copending patent application. A squeeze roller 32 extending the full height of drum 24 is mounted on top and bottom support arms 34 urged conjointly by springs 36 to press the roller firmly against the jacket 28. The spring force is sufficient to compact the jacket foam strands substantially to the solid or substantially fully compacted condition where it passes beneath the roller. Resilience of the jacket foam material causes it to re-expand immediately as it leaves the roller and in so doing to ingest or soak up fresh mixture entering the tank compartment space 38 in which the roller is mounted. Thus each successive longitudinally extending zone or increment of jacket passing the drum becomes saturated with mixture liquid that it then carries around its circuitous path until it again encounters the drum where the mixture liquids are squeezed from the jacket into a receiving compartment 40. Compartment 40 is enclosed and defined by the wall of tank 22, a first end partition 42 that bears in sliding sealing contact on squeeze roller 32, an opposite end partition 44 and an arcuately extending sleeve or partition wall 46. The arcuate partition wall 46 lies close to or makes light sliding contact with the exterior of drum jacket 28 over its internal periphery extending between opposite end partition 44 and a terminus separated by a short gap 48 from end partition 42. When uncoalesced or emulsified oil is expected, drum 24 rotated by geared motor unit 30 is turned sufficiently slowly to allow oil particles ingested into the matrix 28 to settle by gravity and coalesce on the internal pore surfaces in the drum circuit time period from ingestion to purging. Due to the totally quiescent or static conditions in the oil/water mixture contained in the jacket pores during drum rotation, the effect of gravity is enabled to effect such settling and coalescence of the oil particles, however small, on the pore walls; hence stratified or coalesced oil emerges from the jacket along with ingested water through gap 48 when the jacket is squeezed by the roller. Entering outlet compartment 40 the expressed oil promptly rises to the surface of the water where it flows in separate state over a weir 20 into a collecting sump 50 adjacent partition 44. Water pumped through the system by drum rotation flows in an oil-free state over a lower weir or decanting orifice 52 into outlet pipe 18. One or more large-pore foam baffles 56 extend radially between oil outlet 20 and divider 46 at one or more locations between gap 48 and weir 52. Except for an open gap between their lower ends and the bottom of tank 22, baffles 56 extend the full height of the tank compartment 40 so as to further assure that floating oil therein does not reach water outlet pipe 18.

Separated, coalesced oil flowing over weir 20 enters sump 50 from which it is removed by operation of pump 60 under control of sump level switches 62 and 64. Acting through control logic or switching unit 66, a level switch 64 turns on pump 60 whenever oil level in sump 50 rises above a level $L_2$, whereas a level switch 62 turns off pump 60 whenever oil level in sump 50 drops below a lower level $L_1$. Once turned on, pump 60 continues to operate until turned off by switch 62, thereby pumping accummulated oil to a suitable storage facility or the like (not shown). If the rate of oil flowing into sump 50 equals the established pumping rate of pump 60, the pump may remain continuously operative as long as motor unit 30 turns the drum and thereby pumps oil/water mixture at its established rate (bearing a fixed relationship to the pumping rate of pump 60) into and through the unit 16. This will occur in fact if the input oil/water mixture ratio remains constant at a value equal to the maximum allowable ratio or threshold which the system is designed to tolerate without taking special action as previously mentioned.

Should the percentage of oil drop off, the pump 60, of course, will operate only intermittently while the processing drum 24 turns. However, should the percentage of oil in the input mixture increase above the design threshold oil level in sump 50 will continue to rise above level $L_2$ even after the pump 60 is turned on by switch 64. When the rising oil reaches level L₃, level switch 68 is actuated and through control logic 66 or by other means (not shown) initiates any one or more of various possible actions including, for example, sending an alarm signal through leads 70, turning off drum drive motor unit 30 by way of energizing leads 72, and simultaneously turning off pump 12 by way of its energizing leads 74 so that mixture level in receiving compartment 38 does not rise above the top of drum 24 in case the normal operating level sensor 76 and control unit 76' maintaining the desired level in compartment 38 fails to function.

As regards operating levels in the various compartments of processing unit 16, it is desirable that they differ very little even during drum rotation. That is, operating level in input compartment 38 should be held substantially constant and at substantially the level in compartment 40. The substantial uniformity of liquid levels in the unit 16 assures an absence of flow-producing heads acting on foam jacket 24 and thus permits essentially undisturbed quiescence in the liquids being held for settling coalescence in the myriad of small pore spaces of drum jacket 28.

A switch unit 80 actuatable by a float 82 in sump 10 is connected by way of conductor 84 to control unit 66. Switch unit 80 serves as a system demand and shut-off device that functions to energize the system circuits so as to render the system operable in the presence of accumulations of liquid in sump 10 above a level requiring or warranting such operation. Level control switch unit 76 in receiving compartment 38 provides supervisory control over pump 12 to maintain the level substantially constant in compartment 38.

In sum, it will be appreciated that the invention provides an oil detection system based on rates and more specifically on relationship of transfer rates. In the illustrative embodiment, under normal mixture processing conditions, wherein oil present in the water is below the critical percentage for which a special response is required, oil output pump 60 will operate only intermittently. It will thereby maintain oil level in sump 50 between levels $L_1$ and $L_2$. However, should oil in sump 50 rise to level $L_3$ (even with pump 60 operating), indicating a percentage of oil above the safe value, switch 68 will signal that condition and initiate any one or more events appropriate to the situation. Under these conditions, and as long as they continue, switch 68, acting through control unit 66, will turn off the mixture input pump 12 and drum drive motor 30. They remain off until such time as oil level in sump 50 is again reduced to level $L_1$, whereupon actuation of switch 62 turns off oil pump 60 and permits unit 66 to reactivate pump 12 and motor 30. The predetermined ratio of "pumping" rate of drum unit 24, 28 to that of oil pump 60, established to detect excessive percentage of oil in the mixture being processed to separate out the oil, is thus permitted to remain unchanged and the unit to operate in its normal manner even during continued presence of abnormally large amounts of oil in the original mixture. While not shown in the drawings, it is, of course, possible during such abnormal conditions, as an alternative to shutting down the separator at intervals to speed up the operation of pump 60 for as long as necessary to reduce the level of oil in sump 50 to level $L_1$ and thereupon return its pumping rate to its predetermined oil percentage gauging rate. Instead of speeding up pump 60 for this purpose, a second or larger oil output pump (not shown) drawing from sump 50 could be placed in temporary operation as needed to this same end. These and equivalent measures to protect the system against oil overload during continued presence of abnormal oil-rich mixtures will be readily appreciated and implemented by persons of ordinary skill in the art based on the disclosure of the illustrative embodiment as that presently preferred.

Having disclosed the invention in its presently preferred form, it will be appreciated that various changes therein and differing applications of the invention may be made employing the principles involved. It is therefore intended that the claims which follow be construed to give effect to the reasonable range of equivalents of the inventive features and combinations defined thereby.

What is claimed is:

1. Apparatus to detect presence of oil above a predetermined proportion in water comprising separator means having output means with separate receiving compartments for the respective liquids, said separator means adapted for connection to a source of a mixture of such liquids and operable to transfer such mixture therefrom to said output means at a first substantially constant volumetric rate while separating the oil from the water for discharge thereof into their respective receiving compartments, rate responsive measurement means operatively associated with the receiving compartment for the oil, calibrated in relation to such first volumetric rate and operable during such transfer to detect and respond to rate of arrival of such separated oil in such latter receiving compartment exceeding a predetermined fraction of said first volumetric rate, said measurement means comprising pump means operable to transfer oil from said receiving compartment for the oil at a second substantially constant volumetric rate, a predetermined fraction of said first volumetric rate, and associated detector means operable to detect the condition of volumetric rate of separated oil entering said latter receiving compartment exceeding said second volumetric rate by sensing oil in said latter receiving compartment rising above a predetermined upper level therein during operation of said pump means, and energizing circuit means for such pump means including first switch means operable to initiate operation of said pump means in response to level of oil in said latter receiving compartment rising above a predetermined second level, below said upper level, and second switch means operable to terminate operation of said pump means in response to level of oil in said latter receiving compartment dropping below a predetermined third level, below said second level.

2. The combination defined in claim 1 wherein the oil/water separator means comprises an endless band of predetermined width comprising reticulated porous synthetic foam of resilient material having hydrophobic-oleophilic properties, a separator chamber, means movably supporting said band in said chamber and operable to advance the band progressively with the band's width dimension upright and its endless extend moving in a defined horizontal path, squeeze roll means stationed in said chamber at a point along said path and operable to squeeze the band substantially across its full width as it advances past said point so as to purge it of mixture liquid as it approaches said point and so as to permit its resilient re-expansion to ingest mixture liquids as it leaves said point, said chamber comprising a purge space adjacent the opposite side of said squeeze roll means connected to receive mixture from said source, and means in association with said chamber including said receiving compartments operable to separate oil from water squeezed from said band into said purge space by said squeeze roll means.

* * * * *